United States Patent
Wunder et al.

(10) Patent No.: US 11,387,520 B2
(45) Date of Patent: Jul. 12, 2022

(54) SILANATED SILICA-CERAMIC MATERIALS, AND METHODS OF MAKING AND USING THE SAME

(71) Applicant: Temple University—Of The Commonwealth System of Higher Education, Philadelphia, PA (US)

(72) Inventors: Stephanie Wunder, Chadds Ford, PA (US); Mike Zdilla, Wallingford, PA (US); Parameswara Rao Chinnam, Ambler, PA (US)

(73) Assignee: Temple University-Of The Commonwealth System of Higher Education, Philadelphia, PA (US)

( * ) Notice: Subject to any disclaimer, the term of this patent is extended or adjusted under 35 U.S.C. 154(b) by 68 days.

(21) Appl. No.: 16/340,735

(22) PCT Filed: Oct. 9, 2017

(86) PCT No.: PCT/US2017/055707
§ 371 (c)(1),
(2) Date: Apr. 10, 2019

(87) PCT Pub. No.: WO2018/071322
PCT Pub. Date: Apr. 19, 2018

(65) Prior Publication Data
US 2019/0319237 A1    Oct. 17, 2019

Related U.S. Application Data

(60) Provisional application No. 62/406,248, filed on Oct. 10, 2016.

(51) Int. Cl.
*H01M 50/446*    (2021.01)
*H01M 50/403*    (2021.01)
(Continued)

(52) U.S. Cl.
CPC ......... *H01M 50/446* (2021.01); *C04B 41/009* (2013.01); *C04B 41/4861* (2013.01);
(Continued)

(58) Field of Classification Search
None
See application file for complete search history.

(56) References Cited

U.S. PATENT DOCUMENTS

2007/0082261 A1* 4/2007 Lee .................... H01M 2/1686
429/144
2009/0148592 A1* 6/2009 Lyles ............... C04B 35/62655
427/2.27

(Continued)

OTHER PUBLICATIONS

Lago, N., Garcia-Calvo, O., Lopez del Amo, JM., Rojo, T. and Armand, M., All-solid-sate lithium-ion batteries with grafted ceramic nanoparticles dispersed in solid polymer electrolytes, 2015, CHemSusChem, 8, 3039-3043.*
(Continued)

*Primary Examiner* — Brian R Ohara
(74) *Attorney, Agent, or Firm* — Riverside Law LLP

(57) ABSTRACT

The invention provides a novel ceramic-metal oxide-polymer composite material. A functionalized metal oxide nanolayer coating can be bonded between LICGCs and polymers/oligomers, which protects the LICGC from corrosion, has a low interfacial resistance to Li$^+$ migration, and can be a SIC. Hybrid ceramic-polymer electrolytes were formed by engineering the interface between a LICGC and a polymer, polyethylene oxide (PEO), by sputter coating a 200 nm thick SiO$_2$ layer onto a lithium ion conducting glass ceramic (LICGC) and silanating the SiO$_2$ with a functionalized PEG in the presence of LiTFSI. A low interfacial resistance ($R_{interfacial}$) was measured, the same as that obtained for a SiO$_2$ interface soaked with liquid tetraglyme/LiTFSI. The pegylated SiO$_2$ interface (unlike the tetraglyme/LiTFSI
(Continued)

interface) protected the LICGC from corrosion by Li⁰ metal. The (PEG-LiTFSI)—$SiO_2$-LICGC could be bonded with polyethylene oxide/LiTFSI. This procedure provides a general method to bond other LICGCs to PEO-based polymers, and to incorporate other functionalities such as single ion conductivity into the interface via the incorporation of coupling agents with pendant anions.

21 Claims, 14 Drawing Sheets

(51) Int. Cl.
*H01M 10/0525* (2010.01)
*C04B 41/00* (2006.01)
*C04B 41/48* (2006.01)
*C04B 41/50* (2006.01)
*C04B 41/52* (2006.01)
*C04B 41/89* (2006.01)

(52) U.S. Cl.
CPC ...... *C04B 41/4896* (2013.01); *C04B 41/5031* (2013.01); *C04B 41/5035* (2013.01); *C04B 41/522* (2013.01); *C04B 41/89* (2013.01); *H01M 50/403* (2021.01); *H01M 10/0525* (2013.01)

(56) References Cited

U.S. PATENT DOCUMENTS

| | | |
|---|---|---|
| 2014/0072884 A1 | 3/2014 | Zhang |
| 2014/0170465 A1* | 6/2014 | Visco .............. H01G 11/06 429/144 |
| 2014/0186724 A1 | 7/2014 | Hammond |
| 2014/0377670 A1 | 12/2014 | Khiterer |
| 2015/0111086 A1 | 4/2015 | Arnold |
| 2018/0006328 A1* | 1/2018 | O'Neill .............. C08G 65/08 |

OTHER PUBLICATIONS

Ma, C., Zhang, J., Xu, M., Xia, Q., Liu, J., Zao, S., Chen, L., Pan, A., Ivey, DG. and Wei, W., Cross-linked branching nanohybrid polymer electrolyte with monodispersed TiO2 nanoparticles for high performance lithium-ion batteries, Apr. 2016, Journal of Power Sources, 317, 103-111.*

Rahman, IA., Padavettan, V., Synthesis of silica nanoparticles by sol-del: size-dependent properties of surface modification and applications in sislica-polymer nanocomposites—a review, 2012, Journal of Nanomaterials, 2012, 1-15.*

Zhang et al., 2002, Journal of Power Sources, 112, (1), 209-215.

Tenhaeff et al., 2012, Journal of the Electrochemical Society, 159, (12), A2118-A2123.

* cited by examiner

SILANATED SILICA-CERAMIC MATERIALS, AND METHODS OF MAKING AND USING THE SAME

CROSS-REFERENCE TO RELATED APPLICATIONS

The present application is a 35 U.S.C. § 371 national stage patent application of International Patent Application No. PCT/US2017/055707, filed Oct. 9, 2017, which claims priority from U.S. Provisional Patent Application No. 62/406,248, filed on Oct. 10, 2016, all of which are incorporated by reference herein in their entireties.

STATEMENT REGARDING FEDERALLY SPONSORED RESEARCH OR DEVELOPMENT

This invention was made with government support under Grant Nos. DMR 1207221 and CBET 143781, awarded by the National Science Foundation. The government has certain rights in the invention.

BACKGROUND OF THE INVENTION

There is a strong drive for safer lithium ion batteries, as current technology relies upon flammable liquid electrolytes, which occasionally cause LIBs to ignite or explode, causing severe damage, injury, or death. Therefore, solid electrolytes with reduced flammability are a major goal in battery research. Ceramic electrolytes have high ionic conductivity ($\sigma$) and lithium ion transference numbers ($t_{Li}^+ \rightarrow 1$), the fraction of the charge carried by the Li$^+$, making them single ion conductors (SICs), but are brittle, with poor adhesion to or compatibility with lithium metal (Li$^0$). Solid polymer electrolytes (SPE) or polymer SICs (with pendant anions so that only the cations are mobile [Doyle et al., 1994, Electrochimica Acta, 39, (13), 2073-81; Thomas et al., 2000, Journal of Power Sources, 89, (2), 132-138] are flexible and easily processed into thin films that have low interfacial resistance ($R_{int}$), but have low conductivity ($\sigma$ and $t_{Li}^+ \sim 0.2$ for SPE and $t_{Li}^+ \sim 1$ for SICs.

One of the leading technologies under development is the use of ceramic solid electrolytes [Knauth, 2009, Solid State Ionics, 180, (14-16), 911-916; Tenhaeff et al., 2012, Journal of the Electrochemical Society, 159, (12), A2118-A2123]. This technology exhibits good ionic and lithium ion transference numbers of unity, but has major physical and electrochemical issues with its use. The largest of these issues is that ceramics are brittle with low fracture energies [Goodenough and Park, 2013, Journal of the American Chemical Society, 135, (4), 1167-1176; Lee et al., 2014, Energy & Environmental Science, 7, (12), 3857-3886]. Beyond the physical abuse lithium ion batteries are subjected to in use, e.g. shock and vibration in the automotive industry, the battery components (e.g. in the cathodes) physically change shape during charging/discharging as a result of the chemical reactions taking place in the active electrode components, delaminating the LICGC from the electrodes, and resulting in capacity losses. The ceramic electrolytes also have high interfacial resistance, i.e., the resistance of the lithium ions to transfer between anode or cathode and the electrolyte, decreasing efficiency [Zhu et al., 2016, Journal of Materials Chemistry A, 4, (9), 3253-3266; Richards et al., 2016, Chemistry of Materials, 28, (1), 266-273]. In the case of Li$^0$ (or Na$^0$), the ceramics often continually react with the metal, causing the cell to short. These limitations prevent ceramics from being competitive with existing liquid electrolytes.

Another technology currently under investigation is the use of polymers as the electrolyte separator. Polymer electrolytes have the benefit that they adhere well to anode and cathode materials, are relatively flexible and are more compatible with electrode materials than ceramic separators. However, polymer electrolytes have low ionic conductivity [Ling et al., 2006, Prog. Chem., 18, (4), 459-466; Dias et al., 2000, Journal of Power Sources, 88, (2), 169-191], and poor resistance to dendrite growth [Kalnaus et al., 2011, Solid State Ionics, 199, 44-53; Kalnaus et al., 2012, Journal of Power Sources, 201, 280-287]. These are serious hindrances to their adoption for use in commercial batteries as batteries produced with polymer electrolytes will have significantly less power than existing technologies.

Despite extensive research on ceramic and polymer separators, no effective solutions have been reported to solve their major drawbacks. Although transport properties have not been optimized in these hybrid electrolytes, i.e. $t_{Li}^+$ and conductivity is decreased compared with the LICGCs [Zhang et al., 2002, Journal of Power Sources, 112, (1), 209-215], there is consensus that they all form flexible films [Inda et al., 2007, Journal of Power Sources, 174, (2), 741-744], and their fracture toughness improves [Lee et al., 2014, Energy & Environmental Science, 7, (12), 3857-3886]. What has stymied the development of hybrid LICGC-polymer solid electrolytes is the inability to successfully control the interface between the two materials. Organic polymers and ionic ceramics are inherently incompatible, so there is a barrier to the migration of ions across this interface (i.e. there is a high interfacial resistance). Further there are not many ways to modify the ceramic surface to make it compatible and enhance conductivity with organic species [Naim et al., 1999, Solid State Ionics, 121, (1-4), 115-119].

In order to impart mechanical flexibility to brittle inorganic glasses, binders such as PEO-based polymers [Cho et al., 1998, Journal of the Electrochemical Society, 145, (6), 1949-1952; Kohjiya et al., 2002, Solid State Ionics, 154, 1-6; Hayashi et al., 2006, Journal of Power Sources, 163, (1), 289-293], styrene-butadiene rubbers [Inada et al., 2003, Solid State Ionics, 158, (3-4), 275-280], and silicone polymers [Inada et al., 2003, Solid State Ionics, 158, (3-4), 275-280] have been used. However, without the addition of LiX, these polymers are insulators and the composite conductivity typically decreases. A novel recent approach was to form a monolayer of LICGC embedded in a non-conducting polymer matrix, with their tops and bottom surfaces in direct contact with the electrodes [Aetukuri et al., 2015, Advanced Energy Materials, 5, (14), 6]. Since $G_{LATTP} > 20$ GPa, there was no dendrite growth through the particles, and none through the cyclic olefin polymer since it was not a Li conductor [Aetukuri et al., 2015, Advanced Energy Materials, 5, (14), 6].

Addition of LICGC to polymer/LiX or polymer/NaX electrolytes sometimes does not [Kumar et al., 1994, Journal of Power Sources, 47, (1-2), 63-78], and sometimes does [Kumar and Scanlon, 1994, Journal of Power Sources, 52, (2), 261-268; MacFarlane et al., 1998, Electrochimica Acta, 43, (10-11), 1333-1337] increase the conductivity of the polymer, and depends on the volume fraction of the LICGC. Typically for the pure materials: $\sigma_{LICGC} >> \sigma_{polymer}$. At small volume fractions of the LICGC, the conductivity increases [Wang and Pan, 2005, Journal of Polymer Science Part B-Polymer Physics, 43, (6), 743-751; Plocharski and Wieczorek, 1988, Solid State Ionics, 28-30, (Pt. 2), 979-82;

Plocharski et al., 1989, Applied Physics A: Solids and Surfaces, A49, (1), 55-60], and are only comparable to those obtained by adding inert inorganic fillers such as $SiO_2$ [Ramesh and Lu, 2008, Journal of Power Sources, 185, (2), 1439-1443; Subban and Arof, 2003, J. New Mat. Electrochem. Syst., 6, (3), 197-203; Xie et al., 2004, Solid State Ionics, 175, (1-4), 755-758], $TiO_2$ and $Al_2O_3$ to polymers (usually PEO/LiX), where composite ionic conductivity increases by suppression of the PEO crystallinity or by decreasing the affinity of the anion for the Li cation [Quartarone et al., 1998, Solid State Ionics, 110, (1,2), 1-14]. At large volume fractions of LICGC, $\sigma_{total} \rightarrow \sigma_{LICGC}$ is almost never realized [Zhang et al., 2002, Journal of Power Sources, 112, (1), 209-215; Cho and Liu, 1996, Solid State Ionics, 91, (1-2), 1-6; Cho et al., 1997, Solid State Ionics, 95, (3-4), 289-294; Cho and Liu, 1997, Electrochimica Acta, 42, (10), 1481-1488; Skaarup et al., 1990, Solid State Ionics, 40-1, 1021-1024; Ikeda et al., 2001, Polymer, 42, (16), 7225-7228; Hayashi et al., 2001, Chemistry Letters, (8), 814-815] and the polymer appears to act as a binder for the grains [Skaarup et al., 1990, Solid State Ionics, 40-1, 1021-1024] with conductivities 10-100 fold less than the LICGC [Ikeda et al., 2001, Polymer, 42, (16), 7225-7228]. This decrease has been attributed to an inability of the $Li^+$ (or $Na^+$) ions to cross the ceramic-polymer interface [Nairn et al., 1999, Solid State Ionics, 121, (1-4), 115-119; MacFarlane et al., 1998, Electrochimica Acta, 43, (10-11), 1333-1337; Plocharski and Wieczorek, 1988, Solid State Ionics, 28-30, (Pt. 2), 979-82; Plocharski et al., 1989, Applied Physics A: Solids and Surfaces, A49, (1), 55-60], with one factor a lack of intimate interfacial contact between the phases [Tenhaeff et al., 2012, Journal of the Electrochemical Society, 159, (12), A2118-A2123; Inda et al., 2007, Journal of Power Sources, 174, (2), 741-744; Naim et al., 1999, Solid State Ionics, 121, (1-4), 115-119]. The published results strongly suggest that the problem with hybrid ceramic/polymer separators resides in the interfacial region.

There have been several successful reports of hybrid ceramic/polymer separators that exhibit low interfacial resistance. One consisted of polymers and the LICPCGs Lipon (Lithium Phosphorous OxyNitride) or $Li_2O$—$Al_2O_3$—$SiO_2$—$P_2S_5$—$TiO_2$—$GeO_2$, where the high interfacial resistance was eliminated when the Lipon was sputtered onto the polymer [Tenhaeff et al., 2011, Journal of the Electrochemical Society, 158, (10), A1143-A11149] or when the polymer electrolytes were formed directly on top of the ceramic [Tenhaeff et al., 2012, Journal of the Electrochemical Society, 159, (12), A2118-A2123]. A second system was a hybrid formed between hydroxyl terminated oligomers and $Li_2S$—$P_2S_5$ sulfide glasses, where interfacial resistance could be decreased by covalent attachment between the terminal P—SH group of $Li_2S$—$P_2S_5$ to the OH-oxygen atom of a variety of polymers [Hayashi et al., 2006, Journal of Power Sources, 163, (1), 289-293; Hayashi et al., 2011, Solid State Ionics, 192, (1), 130-133; Wong et al., 2014, Proceedings of the National Academy of Sciences of the United States of America, 111, (9), 3327-3331] to form a covalent S—P—O bond [Hayashi et al., 2001, J. Am. Ceram. Soc., 84, (2), 477-479]. In the case of the perfluoroether/LiTFSI oligomers (which were liquids and more importantly SICs themselves), hybrid electrolytes formed with inorganic sulfide glass particles also had $t_{Li}^+ \rightarrow 1$, $\sigma \sim 10^{-4}$ S/cm, only 0.4 to 0.8 lower than the sulfide glass. Further, the hybrid electrolytes were compliant (i.e. flexible), with G=2.6 MPa.

Thus, there is a continuing need in the art for novel materials for use as separator membranes in batteries. This invention fulfills this need.

SUMMARY OF INVENTION

In one aspect, the invention relates to a composite material including a ceramic portion, a metal oxide portion, and a coupling agent portion, wherein the coupling agent is covalently bonded to the metal oxide. In one embodiment, the ceramic includes one of $Li_2O$, $Al_2O_3$, $SiO_2$, $P_2O_5$, $TiO_2$, or $GeO_2$. In one embodiment, the metal oxide is selected from the group consisting of silica or alumina. In one embodiment, the coupling agent is selected from the group consisting of a silane, a carboxylic acid, a carboxylate, or an organic coupling agent. In one embodiment, the coupling agent is derived from one of a functionalized PEG, a reactive coupling agent, or a coupling agent containing a pendant anion. In one embodiment, the coupling agent is derived from one of 2-[methoxy(polyethyleneoxy)propyl]trimethoxysilane, $CH_3O$—$(CH_2CH_2O)_x$—$(CH_2)_3Si(OCH_3)_3$, silyl sulfonylazide, trimethoxysilyl modified polyethylene, $C_{16}H_{38}O_6Si_2$ pendant dipodal silane, 1,2-bis(trimethyoxysilyl)decane, 1,2-bis(trimethyoxysilyl)octane, $(C_2H_5O)_3Si(CH_2)_8Si(OC_2H_5)_3$, 6-azidosulfonylhexyl-triethoxy silane, an anion silane, wherein x=9-12, a 2-[methoxy(polyethyleneoxy)propyl]carboxylate, a 2-[methoxy(polyethyleneoxy)propyl] carboxylic acid, a modified polyethylene carboxylic acid, a PEG functionalized carboxylic acid, a PEO functionalized carboxylic acid, an organic carboxylic acid, and an organic coupling agent. In one embodiment, the composite material further includes a polymer. In one embodiment, the polymer is selected from the group consisting of polyethylene oxide, polyethylene, and polypropylene. In one embodiment, the ceramic is in the form of particles. In one embodiment, the composite material has a conductivity of about $1.5 \times 10^{-4}$ S/cm at 30° C. In one embodiment, the material forms an SIC interface. The present invention also includes a membrane including the composite material of the present invention. The present invention also includes a battery separator includes the membrane of the present invention.

In another aspect, the present invention includes a method for making a composite material including a ceramic. In one embodiment, the method includes depositing a metal oxide layer on a ceramic material, and treating the metal oxide surface with a coupling agent in the presence of a lithium salt. In one embodiment, the metal oxide is selected from the group consisting of silica or alumina. In one embodiment, the ceramic is in the form of particles. In one embodiment, the coupling agent is a silanating agent. In one embodiment, the coupling agent is selected from the group consisting of a functionalized PEG, a reactive coupling agent, or a coupling agent containing a pendant anion. In one embodiment, the coupling agent is selected from the group consisting of 2-[methoxy(polyethyleneoxy)propyl]trimethoxysilane, $CH_3O$—$(CH_2CH_2O)_x$—$(CH_2)_3Si(OCH_3)_3$, silyl sulfonylazide, trimethoxysilyl modified polyethylene, $C_{16}H_{38}O_6Si_2$ pendant dipodal silane, 1,2-bis(trimethyoxysilyl)decane, 1,2-bis(trimethyoxysilyl)octane, $(C_2H_5O)_3Si(CH_2)_8Si(OC_2H_5)_3$, 6-azidosulfonylhexyl-triethoxy silane, an anion silane, wherein x=9-12, a 2-[methoxy(polyethyleneoxy)propyl]carboxylate, a 2-[methoxy(polyethyleneoxy)propyl] carboxylic acid, a modified polyethylene carboxylic acid, a PEG functionalized carboxylic acid, a PEO functionalized carboxylic acid, an organic carboxylic acid, and an organic coupling agent. In one embodiment, the lithium salt is LiTFSI. In one embodiment, the method further includes heating. In one embodiment, the method further includes applying a polymer layer. In one embodiment, the polymer is selected from the group consisting of polyethylene oxide, polyethylene, and polypropylene. In one embodiment, the method further includes casting or melting.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

DETAILED DESCRIPTION

Figure 1:
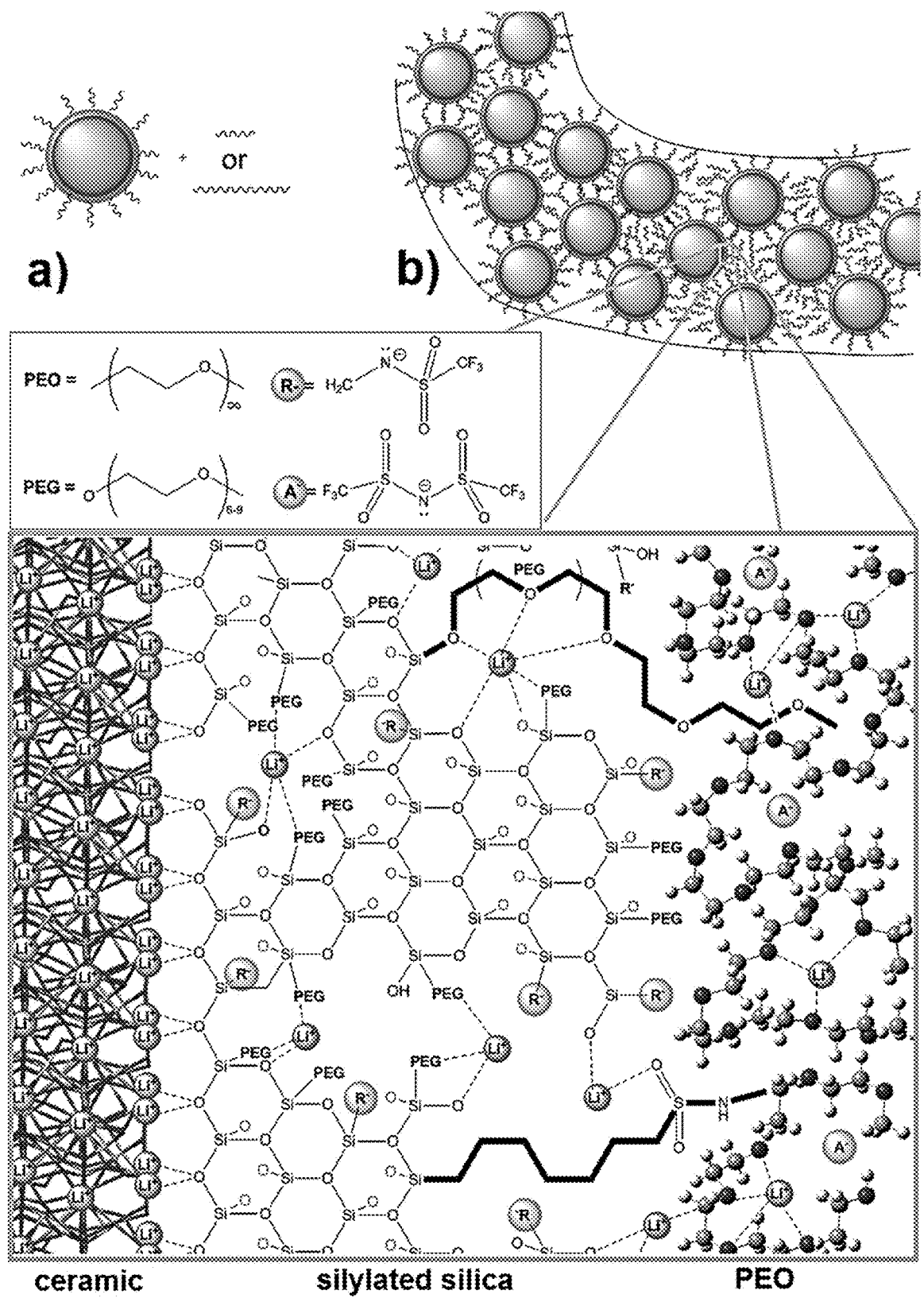
FIG. 1 is a schematic of hybrid LICGC/SPEs: a) LICGC particle with a nanometer thick $SiO_2$ coating, silanated with a compatibilizing polyethylene glycol; b) the flexible composite formed on mixing the $SiO_2$-LICGC with a polymer/oligomer (e.g. PEO/PEG); c) the interfacial region showing: (i) the LICGC adherent to the $SiO_2$; (ii) pendant PEGs to assist $Li^+$ diffusion; (iii) either pendant ($—R^-$) or free ($A^-$) anions; and (iv) pendant groups that have formed covalent bonds (—) to PEO.

The invention relates to composite ceramics coated with metal oxides, such as silanated $SiO_2$, to enable efficient, low resistance bonding with polymers/oligomers, either with bi-ionic lithium salts or SIC polymers with pendant anions. The invention further relates to the preparation of flexible, processible hybrid separators that bond well with battery electrodes, blending the benefits of polymers and ceramics.

Definitions

It is to be understood that the figures and descriptions of the present invention have been simplified to illustrate elements that are relevant for a clear understanding of the present invention, while eliminating, for the purpose of clarity, many other elements found in the art related to ceramic and polymer compositions, battery technology, electrolytes and separator membranes useful for batteries or other electrochemical devices, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +20%, +10%, +5%, +1%, or +0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Abbreviations: LIB: lithium ion battery; LICGC: lithium ion conducting glass ceramic; SPE: solid polymer electrolyte; SIC: single ion conductor; σ=conductivity; $t_{Li}^+$: lithium ion transference number; PEG: polyethylene glycol; PEO: polyethylene oxide; $SiO_2$: silica; $Al_2O_3$: Alumina; $G_4$: tetraglyme; SS: stainless steel; $R_{int}$: interfacial resistance; SEI: solid electrolyte interface; PEG-silane: $CH_3O—(CH_2CH_2O)_{x=9-12}—(CH_2)_3Si(OCH_3)_3$.

Description

In one aspect, the invention relates to compatibilizing inorganic LICGCs with organic bi-ionic (LiX) or SIC polymer electrolytes (FIG. 1). The separator technology described herein consists of using a layer of a metal oxide as the "glue" between an inorganic ceramic and a polymer. In one embodiment, the layer is nanometer thick. Any metal oxide is contemplated by the present invention, as would be understood by one of ordinary skill in the art. Non-limiting examples of metal oxides include silica ($SiO_2$) and alumina ($Al_2O_3$). In one embodiment, the metal oxide is silanated. This metal oxide interface on a LICGC has high adhesive strength to the LICGC, good adhesion to a polymer when the metal oxide is functionalized with a compatibilizing coupling agent, negligible interfacial resistance when functionalized with polyethylene glycol (PEG) and a lithium salt, and prevents corrosion of the LICGC by $Li^0$. Non-limiting examples of the coupling agent include a silane, carboxylic acid, carboxylate, or other organic coupling agent, as would be understood by one of ordinary skill in the art. In one embodiment, the interface is a $SiO_2$ interface, and the $SiO_2$ is silanated with a compatibilizing silane coupling agent.

Various battery types e.g., Li—S, Li-air, Li-ion, Na—S etc., each with different requirements (e.g. operating voltages) are compatible with this approach since the metal oxide interface can be tailored to accommodate a variety of ceramics required for different battery types, and since the metal oxide interface can be functionalized with coupling agents that can be used to bond/adhere the metal oxide to virtually any organic polymer. The technology thus solves several problems in LIBs (safety, conductivity, manufacturing concerns) and is applicable to other battery technologies as well.

In another aspect, the invention relates to a conformal, nanometer-thick metal oxide layer deposited on a highly conductive LICGC which be bonded to a flexible SPE, permitting the formation of hybrid ceramic-polymer solid electrolytes (FIG. 1). In one embodiment, the metal oxide is silica ($SiO_2$). The metal oxide layer functionalized with polyethylene glycols (PEGs) and containing lithium salts (LiX; X=anion) has very low interfacial resistance and protects the LICGC ceramic from degradation by the lithium anode, common problem with ceramic/lithium based batteries. The technology can be used in rechargeable lithium (or sodium, or any other) batteries to provide the benefits of both ceramic and polymer based battery design, solving a significant problem in the battery industry today. The invention addresses fundamental unresolved problems in hybrid electrolytes, namely 1) the high interfacial impedance that is known to develop at the LICGC-polymer interface and 2) prevention of $Li^+$ corrosion of the LICGC, resolves the factors that affect the impedance of this layer, and determine the optimum layer thickness and functionalization parameters required to minimize the interfacial resistance and prevent contact of lithium metal with the ceramic. In addition, with the use of coupling agents containing a pendant anion, this interface can be made a single ion conductor.

In one aspect, the invention relates to development of electrolyte technology to improve not just LIBs, but batteries of all kinds, supercapacitors, and fuel cells, all of which can take advantage of solid electrolytes. In all cases, a broader impact of the invention is the improvement of safety for all users of LIBs. The invention relates to efficient battery technology, which promotes the use of clean energy by improving the efficacy of electric vehicles, facilitating the replace of combustion engines, which emit $CO_2$ and pose environmental and climate risks.

In another aspect, the invention relates to a planar LICGC, a nanometer thick metal oxide layer functionalized with a functionalized PEG and bonded to a PEO/LiTFSI polymer electrolyte, having high ionic conductivity, high lithium ion transference numbers, low interfacial resistance, and the ability to suppress dendrite growth and prevent degradation of the ceramic by lithium metal. Non-limiting examples of the functionalized PEG include PEG-silane, PEG-carboxylate, or any other PEG-organic coupling agent, as would be understood by one of ordinary skill in the art. In one embodiment, the functionalized PEG is PEG-silane. In one embodiment, the metal oxide is $SiO_2$. In some embodiments, the parameters that prevent contact between the ceramic and lithium metal, but still result in low interfacial resistance are the metal oxide layer thickness, and the type of coupling agent. In other embodiments, different methods to deposit the metal oxide can be used. In one embodiment, the metal oxide is applied to ceramic particles.

Some of the liquid electrolytes in use to date have the drawback that they are highly flammable [Goodenough and Kim, 2010, Chemistry of Materials, 22, (3), 587-603]. When a lithium ion cell experiences thermal runaway, a chemical process that occurs when a cell fails, the electrolyte decomposition and release of gas and gas buildup can result in fire or explosion. The separator of the invention will prevents dendrite-induced failure, and does not produce these gasses if a thermal runaway event takes place. This will makes the lithium ion cells containing a separator of the invention much safer than existing technologies. The use of solid LICGC/SPE separators most importantly greatly enhance the safety of batteries using $Li^0$ (or $Na^0$) metal, since dendrite growth is suppressed for high modulus, SIC separators [Li et al., 2014, Journal of Power Sources, 254, 168-182; Harry et al., 2014, Nature Materials, 13, (1), 69-73]. This safety enhancement is a major factor in electric transportation, aviation, computing and communications markets.

Compositions of the Invention

In one aspect, the invention relates to a composite material comprising a ceramic portion, a metal oxide portion, and a coupling agent portion, wherein the coupling agent is covalently bonded to the metal oxide. In one embodiment, the ceramic comprises one of $Li_2O$, $Al_2O_3$, $SiO_2$, $P_2O_5$, $TiO_2$, or $GeO_2$.

In one embodiment, the coupling agent is derived from one of a functionalized PEG, a reactive coupling agent, or a coupling agent containing a pendant anion. In one embodiment, the functionalized PEG is a PEG-silane. In one embodiment, the reactive coupling agent is a silane, carboxylic acid, carboxylate, or any other organic coupling agent, as would be understood by one of ordinary skill in the art. In one embodiment, the coupling agent containing a pendant anion is a silane, carboxylic acid, carboxylate, or any other organic coupling agent, as would be understood by one of ordinary skill in the art. In one embodiment, the coupling agent is a silane. In one embodiment, the coupling agent is derived from one of 2-[methoxy(polyethyleneoxy)propyl] trimethoxysilane, $CH_3O$—$(CH_2CH_2O)_x$—$(CH_2)_3Si(OCH_3)_3$, silyl sulfonylazide, trimethoxysilyl modified polyethylene, $C_{16}H_{38}O_6Si_2$ pendant dipodal silane, 1,2-bis(trimethyoxysilyl)decane, 1,2-bis(trimethyoxysilyl)octane, $(C_2H_5O)_3Si(CH_2)_8Si(OC_2H_5)_3$, 6-azidosulfonylhexyl-triethoxy silane, an anion silane, wherein x=9-12, a 2-[methoxy(polyethyleneoxy)propyl]carboxylate, a 2-[methoxy(polyethyleneoxy)propyl] carboxylic acid, a modified polyethylene carboxylic acid, a PEG functionalized carboxylic acid, a PEO functionalized carboxylic acid, any organic carboxylic acid, and any organic coupling agent, as would be understood by one of ordinary skill in the art. In some embodiments, a reactive coupling agent forms a good interface with PEO-type polymers. Although, this coupling agent forms the strongest interface with polyethylene (PE) and polypropylene(PP), in other embodiments this strength may not be necessary for good electrochemical adhesion to PEO. This is because the $Li^+$ cation often bridges ether oxygens on PEG and PEO, so a good bond may actually develop without the need for a reactive coupling agent. The adhesion to PEO of metal oxide-LICGC functionalized with only a functionalized PEG can be compared to the adhesion of metal oxide-LICGC functionalized with mixed functionalized PEGs and a reactive coupling agent using bond-strength and conductivity tests. In a non-limiting example, the adhesion to PEO of $SiO_2$-LICGC functionalized with only a functionalized PEG-silane can be compared to the adhesion of $SiO_2$-LICGC silanated with mixed PEG-silane and reactive-silane using bond-strength and conductivity tests.

In one embodiment, the composite material further comprises a polymer. In one embodiment, the polymer is selected from the group consisting of polyethylene oxide, polyethylene, and polypropylene. In one embodiment, the ceramic is in the form of particles. In one embodiment, the composite material has a conductivity of about $1.5 \times 10^{-4}$ S/cm at 30° C. In another embodiment, the composite material forms an SIC interface.

In another aspect, the invention relates to a membrane comprising a composite material comprising a ceramic portion, a metal oxide portion, and a coupling agent portion, wherein the coupling agent is covalently bonded to the metal oxide. In one embodiment, the membrane is a part of a battery separator. In one embodiment, the metal oxide is silica. In one embodiment, the coupling agent is silane. In one embodiment, the silane is covalently bonded to silica.

Methods of Making

In another aspect, the invention relates to a method for making a composite material comprising a ceramic, the method comprising: depositing a metal oxide layer on a ceramic material, and treating the metal oxide surface with a coupling agent in the presence of a lithium salt. In one embodiment, the coupling agent is a silanating agent. In one embodiment, the ceramic is in the form of particles. In one embodiment, the method further comprises heating. In another embodiment, the method further comprises applying a polymer layer. In one embodiment, the polymer is selected from the group consisting of polyethylene oxide, polyethylene, and polypropylene. In another embodiment, the method further comprises casting or melting. In one embodiment, the metal oxide is silica.

Metal Oxide Deposition

In one embodiment, the metal oxide can be deposited by processes such as a sol-gel process, chemical vapor deposition (CVD), or sputter coating. In some embodiments, these methods may be required for coating ceramic particles rather than planar surfaces. As readily apparent, various thicknesses for the silica layer can be used. In one embodiment, the optimal thickness of the metal oxide layer needed to decrease interfacial resistance, and maintain sufficient strength to bond to polymer can be determined by means known to those in the art. In some embodiments, the ceramic material is sputtered with metal oxide of thicknesses between 10 nm to 150 nm. In one non-limiting embodiment, the metal oxide may be deposited at a thickness of about 200 nm. In one embodiment, the metal oxide is $SiO_2$. In one embodiment, amorphous $SiO_2$ can be deposited by a sol-gel method in which tetraethoxysilane [$Si(OEt)_4$], TEOS, is hydrolyzed [Sakuda et al., 2008, Electrochemical and Solid State Letters, 11, (1), A1-A3; Sakuda et al., 2009, Journal of the Electrochemical Society, 156, (1), A27-A32; Tatsumisago and Minami, 1987, Nippon Kagaku Kaishi, (11), 1958-1963].

Functionalization

Various functionalization methods can be used, and the functionalization method that yields the best conductivity across the interface can be selected. In one embodiment, the functionalization is silanization. In one embodiment, the functionalization is any method of organic functionalization, as would be understood by one of ordinary skill in the art. In one embodiment, SICs can be formed in the interfacial region. In one embodiment, a PEG silane can be used for $Li^+$ ion conduction in the interfacial region along with another silane to covalently attach, if necessary, the metal oxide to the polymer. In one embodiment, the metal oxide is $SiO_2$.

In one embodiment, functionalization is performed using a coupling agent Non-limiting examples of coupling agents include a functionalized PEG, a reactive coupling agent, and a coupling agent containing a pendant anion. Additional non-limiting examples of coupling agents include a PEG-silane, a reactive silane, and a silane containing a pendant anion. In one embodiment, the coupling agent is selected from the group consisting of 2-[methoxy(polyethyleneoxy)propyl]trimethoxysilane, $CH_3O-(CH_2CH_2O)_x-(CH_2)_3Si(OCH_3)_3$, silyl sulfonylazide, trimethoxysilyl modified polyethylene, $C_{16}H_{38}O_6Si_2$ pendant dipodal silane, 1,2-bis(trimethyoxysilyl)decane, 1,2-bis(trimethyoxysilyl)octane, $(C_2H_5O)_3Si(CH_2)_8Si(OC_2H_5)_3$, 6-azidosulfonylhexyl-triethoxy silane, an anion silane, wherein x=9-12, a 2-[methoxy(polyethyleneoxy)propyl]carboxylate, a 2-[methoxy(polyethyleneoxy)propyl] carboxylic acid, a modified polyethylene carboxylic acid, a PEG functionalized carboxylic acid, a PEO functionalized carboxylic acid, any organic carboxylic acid, and any organic coupling agent, as would be understood by one of ordinary skill in the art. In one embodiment, the coupling agent is a silanating agent. In one embodiment, the lithium salt is LiTFSI.

The functionalization procedure can be optimized for lowest interfacial resistance. In some embodiments, mixed coupling agents can be used to confer more than one property, e.g., bonding, Li conduction, or single ion conductivity, on the interfacial metal oxide layer. Various coupling agents can be used. In some embodiments, the coupling agents used are PEG-silanes, reactive silanes, silanes containing a pendant anion, organic carboxylates/carboxylic acids, reactive carboxylilc acids, or carboxylic acids containing an additional pendant anion.

As readily apparent, O/Li ratios can be optimized for a functionalized PEG/LiTFSI. In one embodiment, the O/Li is about 12/1. In one embodiment, the functionalized PEG is PEG-silane. In some embodiments, the attachment of the functionalized PEG forms a more conductive interface when the lithium salt LiX is added in a separate, second step and not simultaneously. In some embodiments, a reactive coupling agent is necessary to form a good interface with PEO-type polymers. Although, this coupling agent forms the strongest interface with polyethylene (PE) and polypropylene(PP), this strength may not be necessary for good electrochemical adhesion to PEO. This is because the Li cation often bridges ether oxygens on PEG and PEO, so a good bond can develop without the need for a reactive coupling agent. The adhesion to PEO of metal oxide-LICGC modified with only a functionalized PEG can be compared to the adhesion of metal oxide-LICGC modified with mixed functionalized PEGs and a reactive coupling agent using bond-strength and conductivity tests. For example, the adhesion to PEO of $SiO_2$-LICGC silanated with only PEG-silane, can be compared to the adhesion of $SiO_2$-LICGC silanated with mixed PEG-silane and reactive-silane, using bond-strength and conductivity tests.

Figure 11:
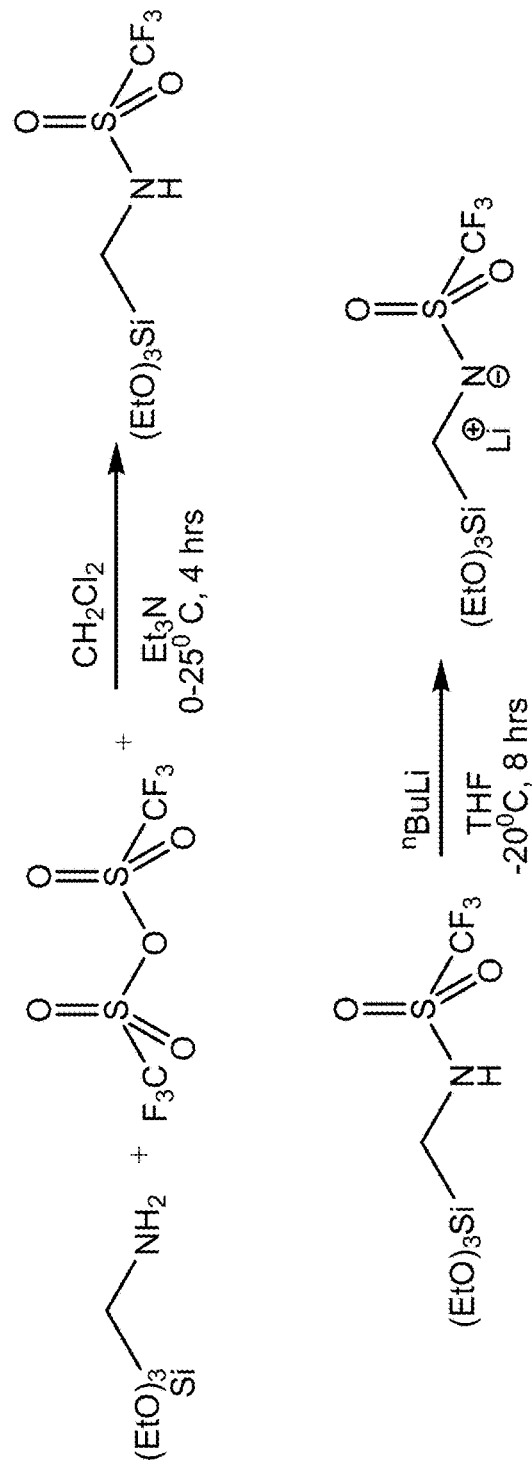
FIG. 11 is a reaction scheme depicting the synthesis of silane with pendant anionic group.

In some embodiments, a functionalized PEG and an anionic coupling agent attached by functionalization to the metal oxide-LICGC together, form an SIC interface. In one embodiment, a PEG-silane and an anion-silane attached by silanization to the $SiO_2$-LICGC together, form an SIC interface. In one embodiment, the anionic coupling agent is an amino-coupling agent. In one embodiment, the anionic coupling agent is an amino-silane. In one embodiment, the reactions to prepare the pendant anions are as presented for example in FIG. 11. In a non-limiting example, an anionic coupling agent can be attached to the metal oxide first, followed by the reaction to form the lithium salt. In one embodiment, an amino-silane can be attached to the $SiO_2$ first, followed by the reaction to form the lithium salt. Conductivity and $t_{Li}^+$ are measured for the mixed coupling agent system.

Self-standing films using PEG-silane and anion-silane can also be prepared in order to determine the conductivity and $t_{Li}^+$ of only the interface layer. The $t_{Li}^{+\ is}$ obtained using the DC polarization/AC impedance spectroscopy method, where the initial interfacial resistance $R^0_{interfacial}$ is measured by AC impedance, followed by chronoamperometry using a DC potential, $\Delta V$, (typically ~80 mV) to record the current evolution from its initial value, $I_0$, until a steady current, $I_\infty$ is obtained. AC impedance spectroscopy is again used to measure, $R_{interfacial}^\infty$, and $t_{Li}^+$ calculated by: $t_{Li}^+=I^\infty(\Delta V-I^0 R^0_{interfacial})/I^0(\Delta V-I^\infty R^\infty_{interfacial})$.

Adding a Polymer

In some embodiments, by adding a polymer to the functionalized metal oxide ceramic material a hybrid ceramic-polymer with low interfacial resistance can be formed. In one embodiment, the metal oxide is silanated. In one embodiment, the metal oxide is selected from the group consisting of silica, alumina, or any other metal oxide. In some embodiments, a membrane comprising the composite hybrid material of the invention can inhibit dendrite growth. In one embodiment, the next step is to either cast or melt press PEO/LiTFSI onto the LICGC, using the current method of metal oxide coating, an optimized metal oxide thickness and functionalization procedure for a functionalized PEG/LiTFSI. In one embodiment, the metal oxide is $SiO_2$ coating. In one embodiment, the functionalization is silanization. In one embodiment, the functionalized PEG is PEG-silane. In some embodiments, short chain oligomers can be used to "bind" the LICGC grains or longer chain polymers that provide greater flexibility.

Methods of Use

In some embodiments, the materials of the invention are relevant to use in batteries, for example lithium batteries. In another aspect, the invention relates to a membrane comprising a composite material comprising a ceramic portion, a metal oxide portion, and a coupling agent portion, wherein the coupling agent is covalently bonded to the metal oxide. In one embodiment, the metal oxide is silica. In one embodiment, the coupling agent is a silane. In one embodiment, the membrane is a part of a battery separator. In some embodiments, the ceramic-polymer hybrid separators can inhibit dendrite growth. In some embodiments, the material has the ability to transfer lithium ions, i.e., has ionic conductivity, has an ability to bond to polyethylene oxide, and to inhibit corrosion of the LICGC by Li. Other properties are thermal and mechanical stability. In some embodiments, the materials of the invention have superior thermal stability compared to known liquid electrolytes, a property especially useful for operation in hotter environments, as batteries that can operate at higher temperatures are actively sought after by the automotive industry. The materials of the invention also allow for higher peak power capabilities within the cells due to the ability to withstand the heat generated during rapid charge and discharge of a battery.

A (PEG/LiTFSI)—$SiO_2$-LICGC/PEO-LiTFSI hybrid can be tested for resistance to dendrite growth. In one embodiment, the method used to evaluate the onset of dendritic growth (as $Li^0$ dendrites span cell) is lithium plating experiments, with the hybrid ceramic separator between a Li foil symmetric cell, using galvanostatic cycling as a function of current density [Stone et al., 2012, Journal of the Electrochemical Society, 159, (3), A222-A227]. This configuration promotes more rapid dendrite growth than a Li/separator/intercalation cathode configuration since both electrodes can form dendrites. A sudden, substantial (>50%), and persistent drop in voltage can be used to indicate that a dendritic short has occurred [Chazalviel, 1990, Phys. Rev. A, 42, (12), 7355-7367; Rosso et al., 2006, Electrochimica Acta, 51, (25), 5334-5340; Brissot et al., 1998, Electrochimica Acta, 43, (10-11), 1569-1574; Brissot et al., 1999, Journal of Power Sources, 81, 925-929].

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1: Ceramic-Polymer Interface

In order to ensure high power density and protect LICGCs from $Li^0$ metal, the interface created between the ceramic and the polymer must have a low interfacial resistance, be able to prevent $Li^0$ (or $Na^0$) corrosion of the LICGC, and adhere to the polymer. The interface and/or the polymer connected to the interface should be stable with respect to $Li^0$ or $Na^0$. Since solid electrolyte interfaces (SEIs) are expected to be formed during charging, an SEI that prevents continual corrosion of the Li, and which has good ionic conductivity and poor electrical conductivity needs to be formed. These SEIs have been shown to form on PEO-type polymers, particularly with added $SiO_2$ [Croce et al., 2001, Electrochimica Acta, 46, (16), 2457-2461; Persi et al., 2002, Journal of the Electrochemical Society, 149, (2), A212-A216], and continual corrosion is prevented since there is very slow diffusion of the formed chemical products through the solid polymer electrolyte.

In order to form a suitable interface that has these attributes, a procedure to deposit nanometer thick layers of metal oxide onto the LICGC has been developed. The resulting layer forms a strong, conformal interface between the two components, and is shown to have very low interfacial resistance when silanated with a PEG-silane/LiTFSI, and can slow down Li corrosion of the LICGC. A commercially available glass was chosen (with a Nasicon crystal structure and proprietary composition based upon $Li_2O$—$Al_2O_3$—$SiO_2$—$P_2O_5$—$TiO_2$—$GeO_2$) as the LICGC (from Ohara Corp.), since it is unstable with respect to $Li^0$, and it can therefore be investigated how effectively this interface (by itself or when bonded to a polymer) protects the LICGC from $Li^0$ corrosion.

Figure 2:
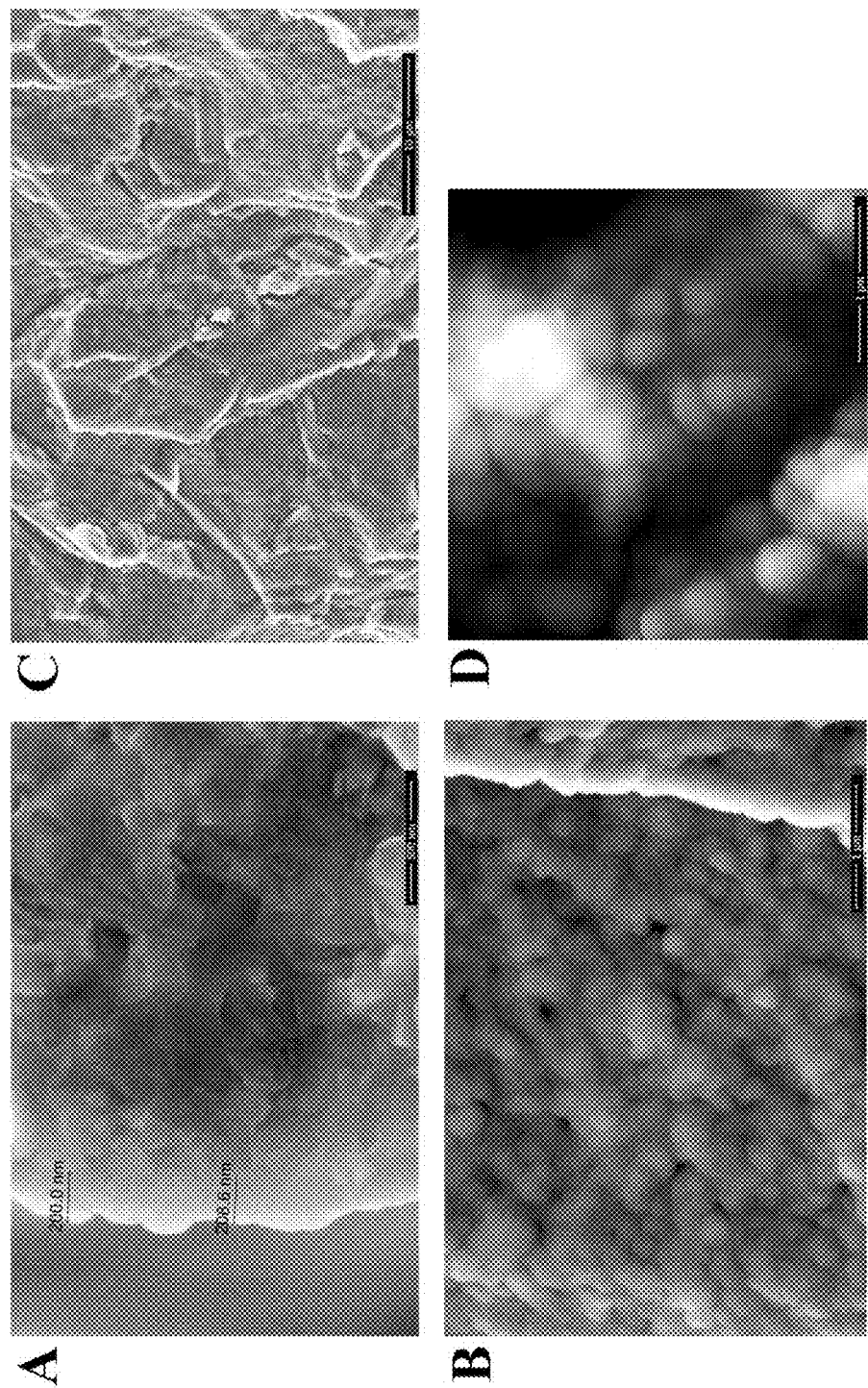
FIG. 2 is a series of photographs depicting the side-view of $SiO_2$-LICGC by scanning electron microscopy (SEM; scale bar 500 nm) (A); and top views using by SEM (scale bars 1 µm B, 10 µm C); and AFM (D).

$SiO_2$ Coating:

A ~200 nm thick $SiO_2$ coating was deposited on both sides of the LICGC by low temperature electron beam evaporation with ion assisted plasma deposition, which was done reproducibly (TwinStar Optics, Coatings & Crystals). The SEM side view clearly shows a conformal coating of the $SiO_2$ on the LICGC. SEM and AFM top views of this coating suggest that it is deposited not only as platelets, but as grains within the platelets, whose dimensions are on the order of 100 nm, and with "grain" boundaries within the platelets that presumably are open spaces (FIG. 2). This demonstrated that a suitable $SiO_2$ layer can be fabricated for the next step of the process, silanization.

Unlike ceramics, metal oxides, such as $SiO_2$, $Al_2O_3$, and other metal oxides, can be easily modified with a broad range of coupling agents, including organic coupling agents, which can compatibilize the surface with organic polymers and also be used to covalently attach anions to the metal oxide, so that a SIC interface is formed. The silanization step was developed to fill gaps between the metal oxide domains, provide a conduction path for $Li^+$ ions, and act as a bonding agent to the polymer electrolyte.

Figure 3:
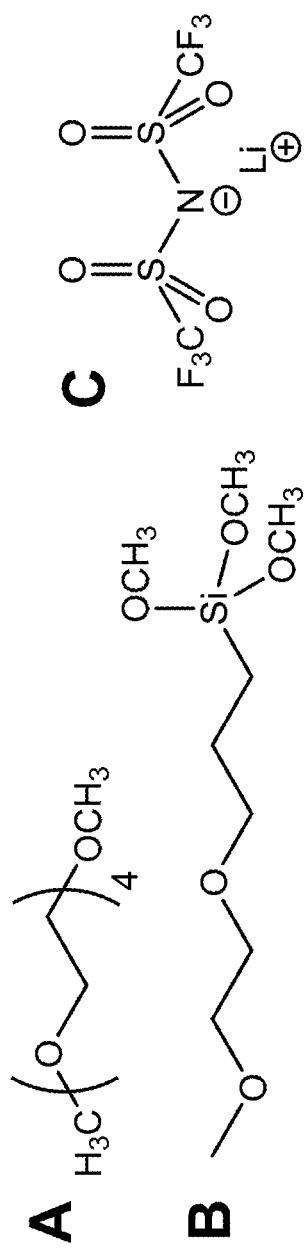
FIG. 3 depicts the structures of A) tetraglyme ($G_4$), B) 2-[methoxy(polyethyleneoxide)$_{6-9}$propyl]trimethoxysilane (PEG-silane), and C) bis(trifluoromethane)sulfonimide lithium salt (LiTFSI).
Figure 4:
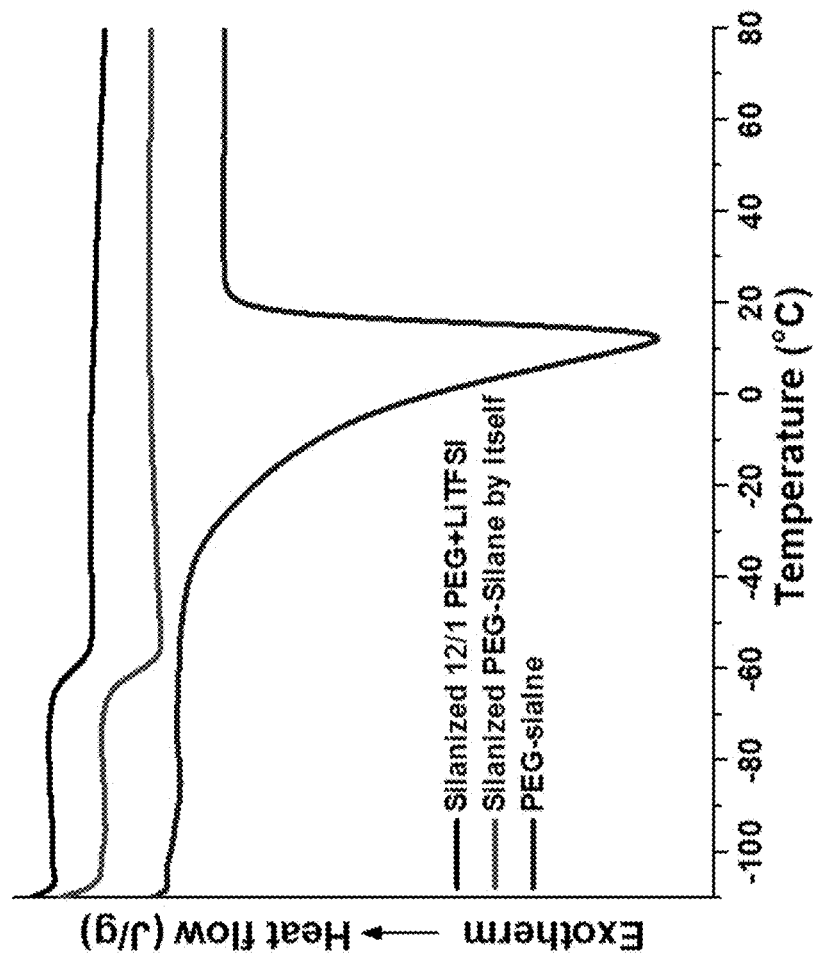
FIG. 4. DSC data of PEG-silane (blue line); crosslinked PEG-silane (red line); and PEG-silane crosslinked in the presence of LiTFSI (O/Li)=12/1 (black line).

Silanization of the $SiO_2$ Coating:

The silanization of the $SiO_2$-LICGC demonstrated that a conduction path existed through the $SiO_2$ coating and that good bonds could be formed between the components. The $SiO_2$-LICGC was silanated with commercially available 2-[methoxy(polyethyleneoxy)propyl]trimethoxysilane, $CH_3O$—$(CH_2CH_2O)_x$—$(CH_2)_3Si(OCH_3)_3$, x=9-12 (PEG-silane) in the presence of LiTFSI, using a mole ratio of 12/1 (O/Li, FIG. 3) using a literature approach [Maitra et al., 2003, Langmuir, 19, (21), 8994-9004]. The solution was concentrated by heating, the $SiO_2$-LICGC soaked in this concentrated solution, the excess wiped off, and the PEG-silanated $SiO_2$-LICGC cured in a vacuum oven at 100° C. for 72 h. Control films of the organic components (without the $SiO_2$-LICGC) were made by evaporating the material the same way in a vial or on a glass slide. As another control, the $SiO_2$-LICGC soaked in tetraglyme ($G_4$) and $G_4$/LiTFSI (O/Li=4/1) (FIG. 3) was prepared, which is analogous but lacks the covalent attachment to the $SiO_2$. DSC data of the PEG-silane, and films of the crosslinked PEG silane, by itself and with added LiTFSI (O/Li=12/1) (FIG. 4) show that the crosslinking reaction suppresses the original PEG-silane crystallinity, and increases the glass transition temperature ($T_g$) from −100° C. to ~−60° C. The data demonstrates that all of the PEG-silane is bonded/crosslinked with the $SiO_2$ and that there is no free PEG-silane in the $SiO_2$ interface (although there is too little material in the PEG-silane/LiTFSI—$SiO_2$-LICGC to perform DSC). As anticipated, the PEG-silane/LiTFSI fills the interstices of the deposited $SiO_2$, providing a critically important conduction path for the Li ions.

Figure 5:
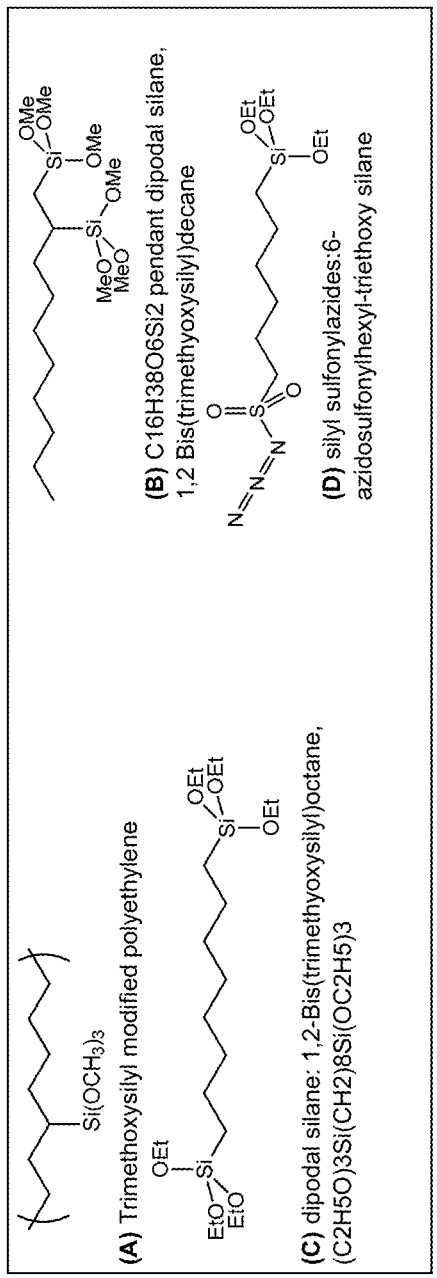
FIG. 5 depicts the structures of silanes used to functionalize $SiO_2$-LICGC for bonding to polyethylene or polypropylene.
Figure 6:
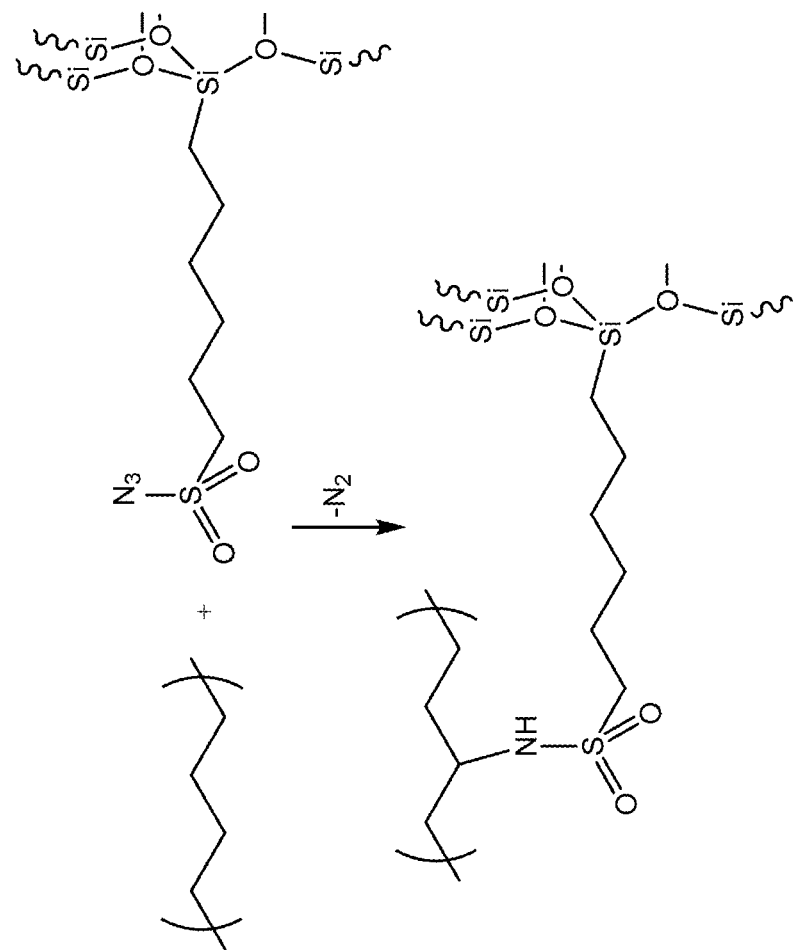
FIG. 6 depicts the chemical crosslinking between azidosulfonyl linker and polyethylene.
Figure 7:
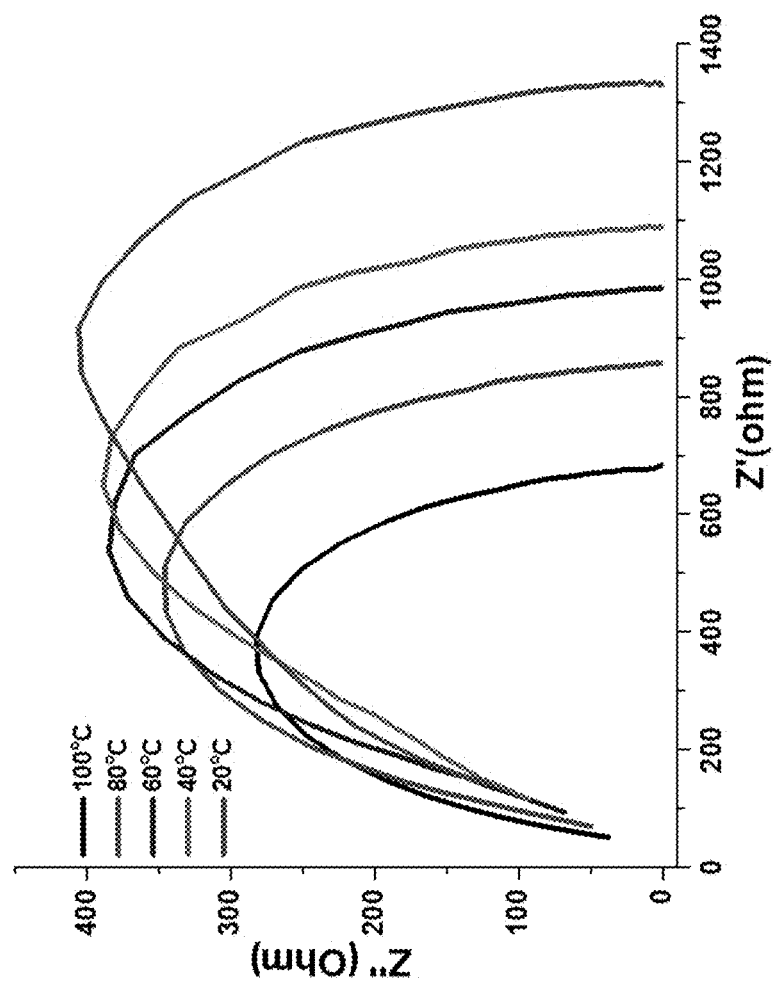
FIG. 7 is a chart depicting Z" vs Z' for LICGC as a function of temperature; 0.25 $cm^2$; SS electrodes.

Bonding to Polymers:

Metal oxides can also be bonded with coupling agents, including organic coupling agents, that can bond (or entangle) with polymer chains. This was demonstrated using a "worst case" scenario, namely, hydrophobic polymers (polyethylene (PE) and polypropylene (PP)), since they are incompatible with ionic ceramics. Several possibilities were considered for bonding the $SiO_2$ to the relatively inert polypropylene or polyethylene. For polyethylene, a silane copolymer with polyethylene chains is available (FIG. 5A), so the polyethylene chains of the silane can entangle with polyethylene films upon solvent casting or melting. For both polyethylene and polypropylene, dipodal silanes, with two anchoring "feet" to the $SiO_2$ (providing 6 rather than 3 bonds to the SiOH groups) and an intervening alkyl (decane or octane) chain to entangle with the polyethylene or polypropylene chains, were investigated (FIGS. 5 B and C). Lastly, a reactive silane (FIG. 5D was considered that forms covalent bonds (replacing C—H with C—C bonds) with polypropylene or polyethylene (FIG. 6).

The silanes were tested with polyethylene or polypropylene. The silane coupling agents were applied to quartz (crystalline $SiO_2$), borosilicate slides or Vicor (amorphous $SiO_2$) glass by dissolution/evaporation in acetone. Polyethylene, polypropylene or laminate (with polypropylene layer) were heat pressed (~100° C.) using a simple weight for 1 h. The order of bond strength, using a simple peel test was: polyethylene-silane <dipodal silane ≪reactive silane. Since the greatest bond strength was achieved using the reactive silane, it was then evaluated between two quartz slides (silanated with silyl sulfonylazide) and between two lithium phosphate glass pieces on which the $SiO_2$ coating had been deposited (and silanated with silyl sulfonylazide). These exhibited similar peel behavior (a strong bond), indicating that there was good adhesion between the $SiO_2$ coating and the lithium phosphate ceramic glass. Once these preliminary results were obtained, the reactive silane (6-azidosulfonyl-hexyl-triethoxy silane) was applied to the $SiO_2$ coated lithium phosphate ceramic glass and polypropylene, and the percent silane in acetone and the silanization time were varied to optimize the bond strength, with the highest bond strengths of >1.5 kg (2 wt % silane overnight treatment). These results give guidance on the conditions necessary to prepare $SiO_2$-LICGC interfaces with mixed silanes, which will be required for interfaces that are SICs (e.g. PEG-silane for Li ion conduction and anion-silane to provide immobile anions) or interfaces with different silanes to conduct Li ions (e.g. PEG-silane) and bond to a polymer (e.g. reactive silane).

Example 2: Silanated Silica Ceramic Conductivity

Conductivity tests show that low interfacial resistance (high conductivities) can be obtained when the LICGC-$SiO_2$ is silanated with PEG-silane/LiTFSI (O/Li=12/1) or infused with mixtures of $G_4$/LiTFSI (O/Li=4/1). The area of each sample was kept at 0.25 $cm^2$. The conductivity of the pure LICGC was tested between stainless steel (SS) electrodes, using carbon paste to make electrical contact. Temperature dependent Z" vs Z' impedance plots from the EIS data (FIG.

Figure 8:
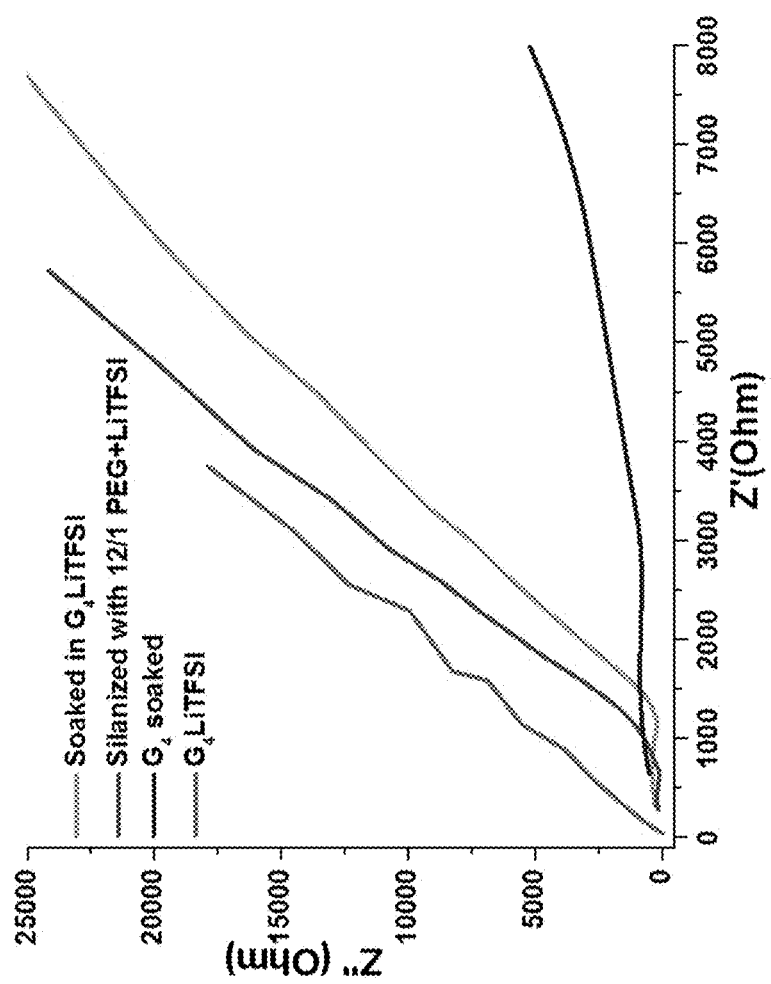
FIG. 8 is a chart depicting Z" vs Z' at 30° C. for $G_4$/LiTFSI as a freestanding film (magenta line) and for $SiO_2$-LICGC soaked in $G_4$ (blue line), $G_4$+LiTFSI (O/Li=4/1), (black line) and silanated with PEG-silane+LiTFSI (O/Li=12/1) (red line); 0.25 $cm^2$; SS electrodes.
Figure 9:
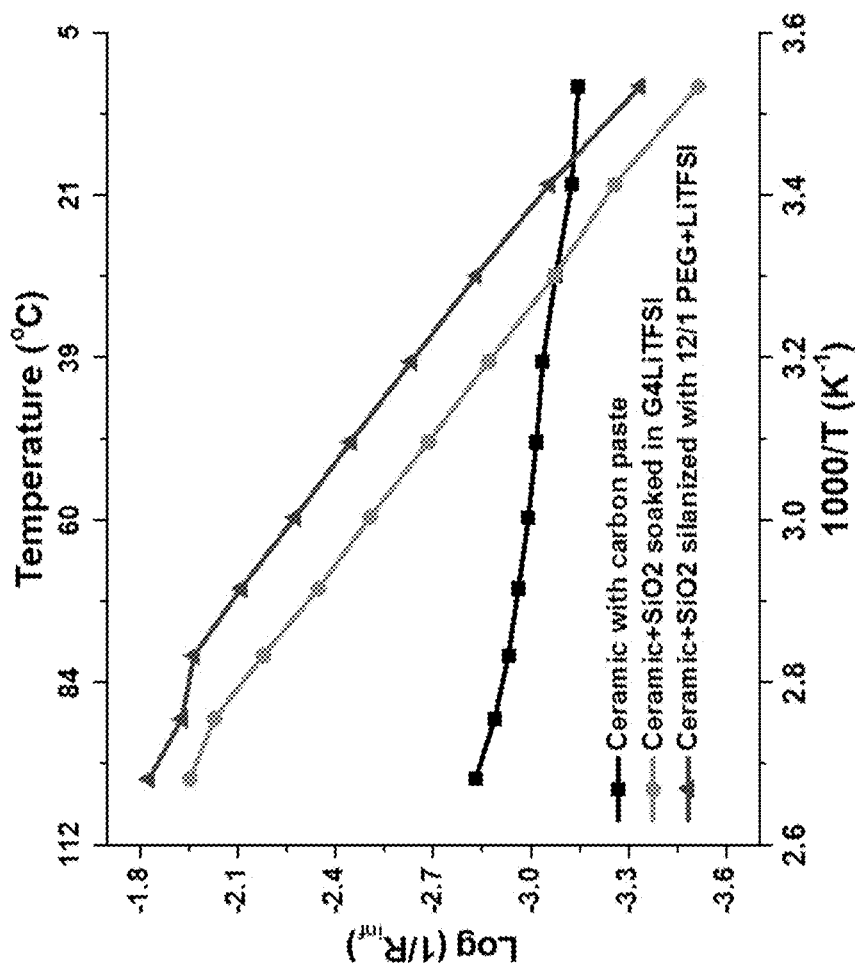
FIG. 9 is a chart depicting log (1/$R_{int}$) vs i/T for LICGC (black line), $SiO_2$-LICGC infused with $G_4$/LiTFSI (red line), and (PEG/LiTFSI)—$SiO_2$-LICGC (blue line); 0.25 $cm^2$; SS electrodes.

7) are similar to those reported in the literature [Zhu et al., 2016, Journal of Materials Chemistry A, 4, (9), 3253-3266; Richards et al., 2016, Chemistry of Materials, 28, (1), 266-273]. At low temperature there are two distinguishable semicircles. The one at higher frequency (to the left) is attributed to the grain boundary resistance, with the bulk resistance the intercept at high frequency (125Ω). The semicircle at lower frequency (to right) is attributed to the resistance between the LICGC and the conductive paste. With increasing temperature, the two semicircles form one broadened semicircle, with the high frequency intercept still the bulk resistance of 125Ω and a conductivity of $1.5 \times 10^{-4}$ S/cm at 30° C., in agreement with data provided by the supplier (Ohara Corp.). By comparison, the impedance data for tetraglyme ($G_4$)/LiTFSI (O/Li=4/1) shows only a slanted straight line (FIG. 8), due to electrode polarization, with no semicircle from interfacial resistance.

For the $SiO_2$-LICGC (with the 200 nm thick $SiO_2$ layer), impedance data were obtained with the $SiO_2$ infused with $G_4$, $G_4$/LiTFSI (O/Li=4/1) and silanated with PEG-silane in the presence of LiTFSI (O/Li=12/1). Unlike the LICGC disc (which requires carbon paste for adhesion), all the samples had good contact with the stainless steel electrodes. All of the high frequency intercepts (within experimental uncertainty, and as the result of the slight difference in thickness between the LICGC with and without the $SiO_2$ coating) are the same, and indicate a bulk resistance of 125Ω and a conductivity of $1.5 \times 10^{-4}$ S/cm at 30° C. In the absence of lithium ions in the interfacial region for the $SiO_2$ only infused with $G_4$ (or only PEG-silane), the interfacial impedance is very high. When the lithium salt is added, the interfacial impedance decreases significantly, with a temperature dependence shown in FIG. 8. The impedance of the $SiO_2$ silanated with PEG-silane in the presence of LiTFSI (O/Li=12/1) is slightly less than that of the $G_4$/LiTFSI (O/Li=4/1). This shows that an immobile material (i.e. the PEG covalently attached to $SiO_2$) of low resistance (similar to a liquid) can be used to shuttle $Li^+$ ions across the interface.

Example 3: Li Corrosion/Dendrite Growth

Figure 10A:
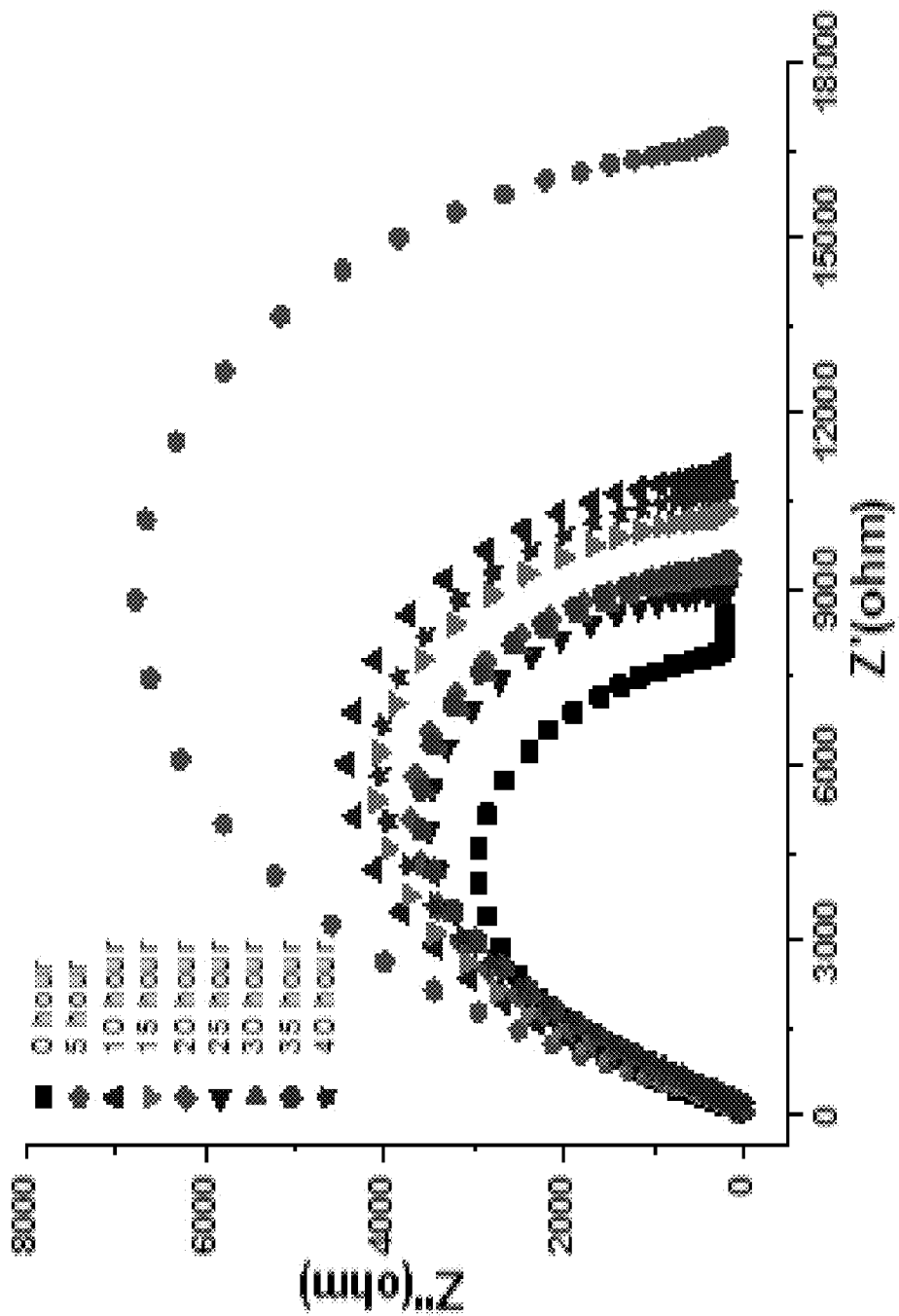
FIG. 10 is a series of charts depicting Z" vs Z' as a function of time at 25° C., $Li^0$ electrodes, 0.25 $cm^2$, for Li A) $G_4$/LiTFSI (O/Li=4/1); B) $SiO_2$-LICGC soaked in $G_4$/LiTFSI (O/Li=4/1) and C) silanated with PEG-silane in presence of LiTFSI (O/Li=12/1); D) $R_{tot}$ plotted as a function of time at 25° C. for data in A, B and C.
Figure 10B:
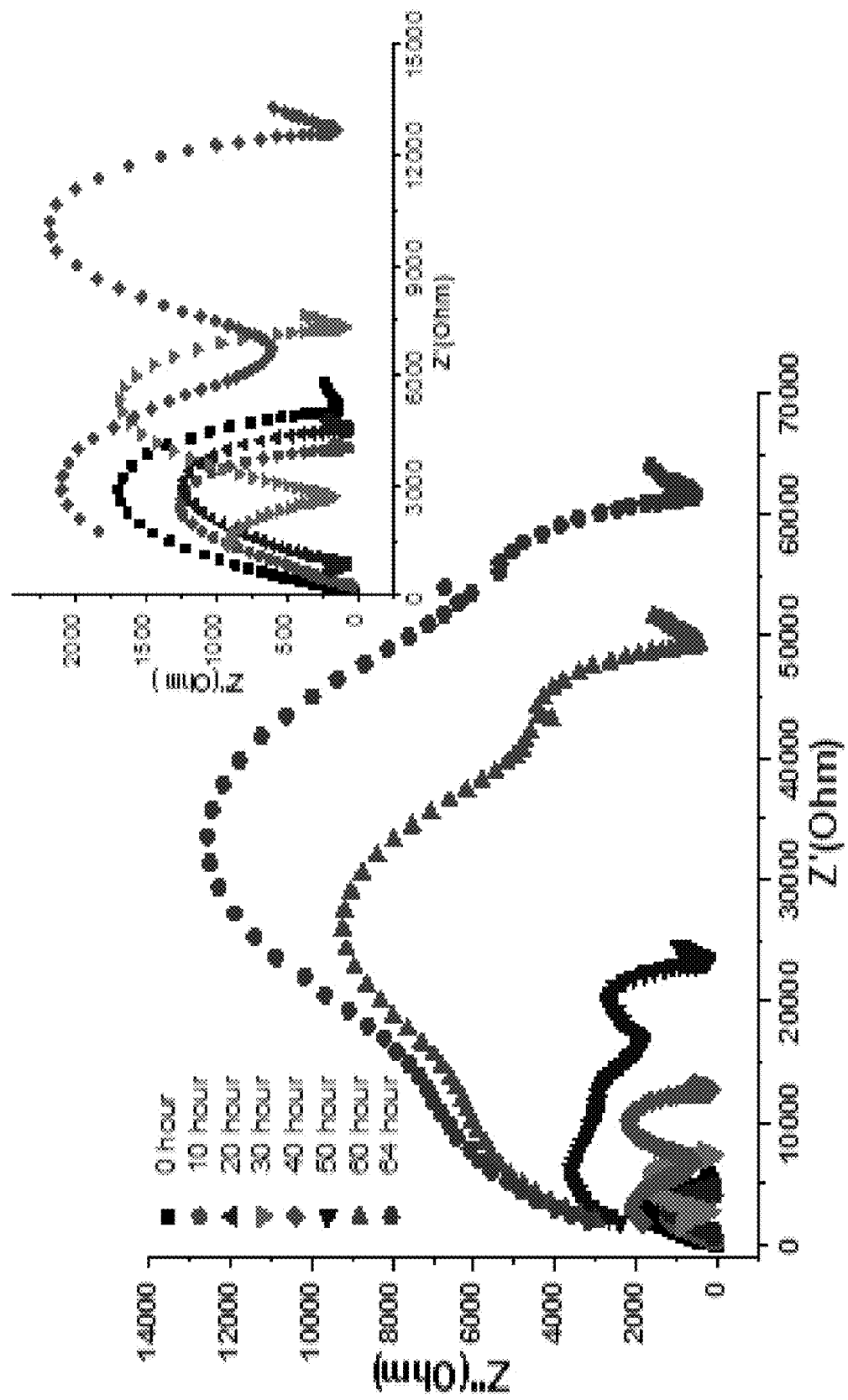
Figure 10C:
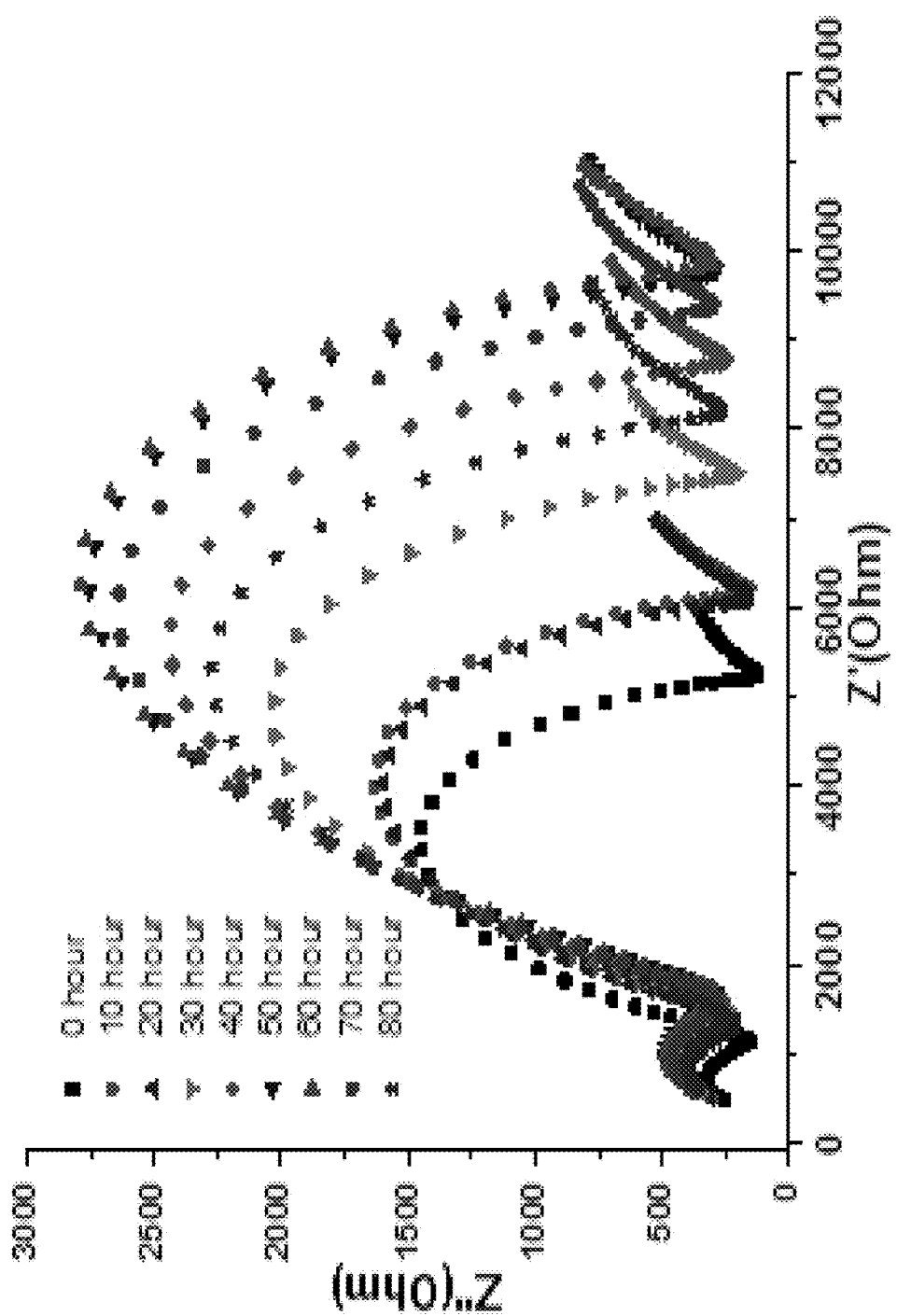
Figure 10D:
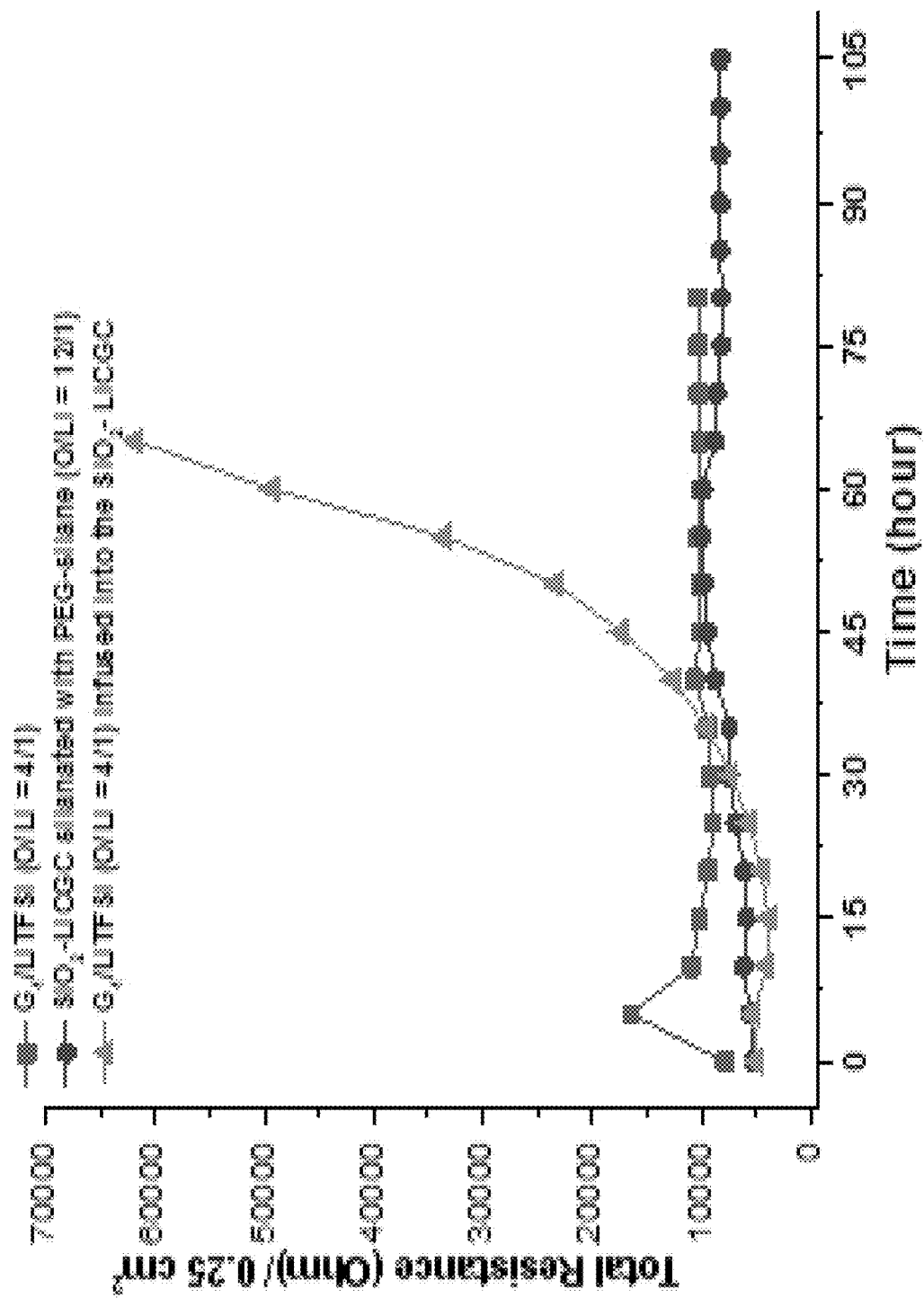

The $SiO_2$-LICGC (which is unstable with respect to $Li^0$), when silanated with PEG/LiTFSI (PEG/LiTFSI—$SiO_2$-LICGC), reduces the ability of Li metal to corrode the LICGC. FIG. 10 shows a comparison of the total resistance ($R_{tot}$), which includes the interfacial resistance ($R_{int}$), between the LICGC and PEG/LITFSI—$SiO_2$, charge-transfer resistance ($R_{CT}$), and resistance from the SEI ($R_{SEI}$), using $Li^0$ metal electrodes, as a function of time for $G_4$/LiTFSI (O/Li=4/1), $G_4$/LiTFSI (O/Li=4/1) infused into the $SiO_2$-LICGC, and PEG/LiTFSI—$SiO_2$-LICGC. For the $G_4$/LiTFSI (O/Li=4/1), only the bulk resistance of the $G_4$/LiTFSI and $R_{CT}$ and $R_{SEI}$ are observed (FIG. 10A). As shown in FIG. 10 D, $R_{CT+SEI}$ first increases and then decreases and stabilizes ($R_{bulk}$ remains same). For the $G_4$/LiTFSI (O/Li=4/1) infused into the $SiO_2$-LICGC (FIG. 10 B), only one semicircle was observed initially, which is attributed to the contributions of bulk and $R_{tot}$. With time, many semicircles were seen that increased in diameter and were attributed to the continuous reaction of the LICGC with lithium, generating electronic and ionic conduction path ways in the cell, which eventually shorted in 60 h. By contrast, for the PEG/LiTFSI—$SiO_2$-LICGC, $R_{CT+SEI}$ increases for 60 hrs and then decreases and stabilizes (as in the case of the glyme/LiTFSI) since the properties of the glyme/TFSI determine the interaction with the $Li^0$ (FIG. 10 C, D). The interfacial resistance (semicircle at high frequency) in FIG. 10 C, does not change with time and is ~1000Ω. Thus liquid ($G_4$/LiTFSI) in the $SiO_2$ did not protect the LICGC from Li corrosion, while the crosslinked and chemically attached PEG did prevent corrosion of the LICGC by $Li^0$.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A composite material comprising a ceramic portion, a metal oxide portion, and a coupling agent portion, wherein the coupling agent is covalently bonded to the metal oxide and the metal oxide portion has a different composition than the ceramic portion.

2. The composite material of claim 1, wherein the ceramic comprises one or more of $Li_2O$, $Al_2O_3$, $SiO_2$, $P_2O_5$, $TiO_2$, or $GeO_2$.

3. The composite material of claim 1, wherein the metal oxide is selected from the group consisting of silica or alumina.

4. The composite material of claim 1, wherein the coupling agent is selected from the group consisting of a silane, a carboxylic acid, a carboxylate, or an organic coupling agent.

5. The composite material of claim 1, wherein the coupling agent is derived from one of a functionalized PEG, a reactive coupling agent, or a coupling agent containing a pendant anion.

6. The composite material of claim 1, wherein the coupling agent is derived from one of 2-[methoxy(polyethyleneoxy)propyl]trimethoxysilane, $CH_3O-(CH_2CH_2O)_x-(CH_2)_3Si(OCH_3)_3$, silyl sulfonylazide, trimethoxysilyl modified polyethylene, $C_{16}H_{38}O_6Si_2$ pendant dipodal silane, 1,2-bis(trimethyoxysilyl)decane, 1,2-bis(trimethyoxysilyl) octane, $(C_2H_5O)_3Si(CH_2)_8Si(OC_2H_5)_3$, 6-azidosulfonyl-hexyl-triethoxy silane, an anion silane, wherein x=9-12, a 2-[methoxy(polyethyleneoxy)propyl]carboxylate, a 2-[methoxy(polyethyleneoxy)propyl] carboxylic acid, a modified polyethylene carboxylic acid, a PEG functionalized carboxylic acid, a PEO functionalized carboxylic acid, an organic carboxylic acid, and an organic coupling agent.

7. The composite material of claim 1, further comprising a polymer.

8. The composite material of claim 7, wherein the polymer is selected from the group consisting of polyethylene oxide, polyethylene, and polypropylene.

9. The composite material of claim 1, wherein the ceramic is in the form of particles.

10. The composite material of claim 1, wherein the composite material has a conductivity of about $1.5 \times 10^{-4}$ S/cm at 30° C.; or
wherein the material forms an SIC interface.

11. A membrane comprising the composite material of claim 1.

12. A battery separator comprising the membrane of claim 11.

13. A method for making a composite material comprising a ceramic, the method comprising:
depositing a metal oxide layer on a ceramic material, and treating the metal oxide surface with a coupling agent in the presence of a lithium salt, wherein the metal oxide layer has a different composition than the ceramic material.

14. The method of claim 13, wherein the metal oxide is selected from the group consisting of silica or alumina.

15. The method of claim 13, wherein the ceramic is in the form of particles.

16. The method of claim 13, wherein the coupling agent is selected from the group consisting of a silanating agent, functionalized PEG, a reactive coupling agent, or a coupling agent containing a pendant anion.

17. The method of claim 13, wherein the coupling agent is selected from the group consisting of 2-[methoxy(polyethyleneoxy)propyl]trimethoxysilane, $CH_3O-(CH_2CH_2O)_x-(CH_2)_3Si(OCH_3)_3$, silyl sulfonylazide, trimethoxysilyl modified polyethylene, $C_{16}H_{38}O_6Si_2$ pendant dipodal silane, 1,2-bis(trimethyoxysilyl)decane, 1,2-bis(trimethyoxysilyl)octane, $(C_2H_5O)_3Si(CH_2)_8Si(OC_2H_5)_3$, 6-azidosulfonylhexyl-triethoxy silane, an anion silane, wherein x=9-12, a 2-[methoxy(polyethyleneoxy)propyl]carboxylate, a 2-[methoxy(polyethyleneoxy)propyl]carboxylic acid, a modified polyethylene carboxylic acid, a PEG functionalized carboxylic acid, a PEO functionalized carboxylic acid, an organic carboxylic acid, and an organic coupling agent.

18. The method of claim 13, wherein the lithium salt is LiTFSI.

19. The method of claim 13, further comprising heating, casting, or melting.

20. The method of claim 13, further comprising applying a polymer layer.

21. The method of claim 20, wherein the polymer is selected from the group consisting of polyethylene oxide, polyethylene, and polypropylene.

* * * * *